(12) United States Patent
Showcatally

(10) Patent No.: US 10,622,711 B2
(45) Date of Patent: Apr. 14, 2020

(54) FOIL LAMINATE FOR HERMETIC ENCLOSURES

(71) Applicant: Itron, Inc., Liberty Lake, WA (US)

(72) Inventor: Shawn Showcatally, Mankato, MN (US)

(73) Assignee: Itron, Inc., Liberty Lake, WA (US)

( * ) Notice: Subject to any disclaimer, the term of this patent is extended or adjusted under 35 U.S.C. 154(b) by 217 days.

(21) Appl. No.: 15/721,304

(22) Filed: Sep. 29, 2017

(65) Prior Publication Data

US 2019/0103667 A1    Apr. 4, 2019

(51) Int. Cl.
| | |
|---|---|
| *H01Q 1/42* | (2006.01) |
| *H01Q 21/28* | (2006.01) |
| *H01Q 1/38* | (2006.01) |
| *B32B 3/26* | (2006.01) |
| *B32B 3/30* | (2006.01) |
| *B32B 7/12* | (2006.01) |
| *B32B 15/085* | (2006.01) |
| *B32B 15/12* | (2006.01) |
| *B32B 15/20* | (2006.01) |

(Continued)

(52) U.S. Cl.
CPC ............ *H01Q 1/42* (2013.01); *B32B 3/266* (2013.01); *B32B 3/30* (2013.01); *B32B 7/12* (2013.01); *B32B 15/085* (2013.01); *B32B 15/12* (2013.01); *B32B 15/20* (2013.01); *B32B 27/10* (2013.01); *B32B 27/32* (2013.01); *H01Q 1/38* (2013.01); *H01Q 21/28* (2013.01); *B32B 2307/7265* (2013.01); *B32B 2457/00* (2013.01)

(58) Field of Classification Search
CPC . H01Q 1/42; H01Q 21/28; H01Q 1/38; B32B 15/20; B32B 3/30; B32B 7/12; B32B 15/085; B32B 3/266; B32B 27/10; B32B 27/32; B32B 15/12; B32B 2307/7265; B32B 2457/00
See application file for complete search history.

(56) References Cited

U.S. PATENT DOCUMENTS

| | | | | |
|---|---|---|---|---|
| 5,401,901 | A * | 3/1995 | Gerry | B32B 7/02 174/391 |
| 2005/0255261 | A1* | 11/2005 | Nomula | B65D 3/22 428/34.2 |

(Continued)

OTHER PUBLICATIONS

Canadian Office Action dated Sep. 16, 2019, for Canadian Patent Application No. 3018830, a counterpart foreign application of U.S. Appl. No. 15/721,304, 5 pages.

*Primary Examiner* — Hai V Tran
*Assistant Examiner* — Michael M Bouizza
(74) *Attorney, Agent, or Firm* — Lee & Hayes, P.C.

(57) ABSTRACT

An electronics enclosure is configured to provide protection against a wet and/or humid environment, and that is configured to allow radio frequency (RF) reception and transmission by electronics within the enclosure. In an example of the enclosure, a plurality of layers interact synergistically to provide protection against moisture and a plurality of low cost antennas are disposed proximate an exterior of the enclosure. In the example, a foil layer of the enclosure defines a small opening, through which RF and electrical coupling occurs. The coupling ensures electrical connection to the antenna(s), defined in a layer proximate an exterior of the enclosure.

20 Claims, 3 Drawing Sheets

(51) Int. Cl.
  *B32B 27/10*    (2006.01)
  *B32B 27/32*    (2006.01)

(56) References Cited

U.S. PATENT DOCUMENTS

2010/0253538 A1* 10/2010 Smith .................. H01Q 1/2233
                                                340/870.02
2019/0089052 A1*  3/2019 Yong ........................ H01Q 3/34

* cited by examiner

FOIL LAMINATE FOR HERMETIC ENCLOSURES

BACKGROUND

In certain systems, electronic equipment must operate in wet or damp environments. Examples include water meters, marine vehicles and outdoor installations. An enclosure may help to increase the useful life of the electronics. However, enclosures made of plastic tend to allow moisture to permeate over time, and electronic failures can result. While more water-resistant enclosures can be made, design requirements including cost and connectivity to radio frequency (RF) networks make known enclosures ill-suited to this purpose.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

The disclosure describes techniques for providing an electronics enclosure that is configured to provide protection against a wet and/or humid environment, and that is configured to allow radio frequency (RF) reception and transmission by electronics within the enclosure. In an example of the enclosure, a plurality of layers interact synergistically to provide protection against moisture while positioning a plurality of low cost antennas in an external location so that transmission and/or reception by the antennas will not be significantly impeded by the foiled layer(s) in the laminate.

Example System and Techniques

Figure 1:
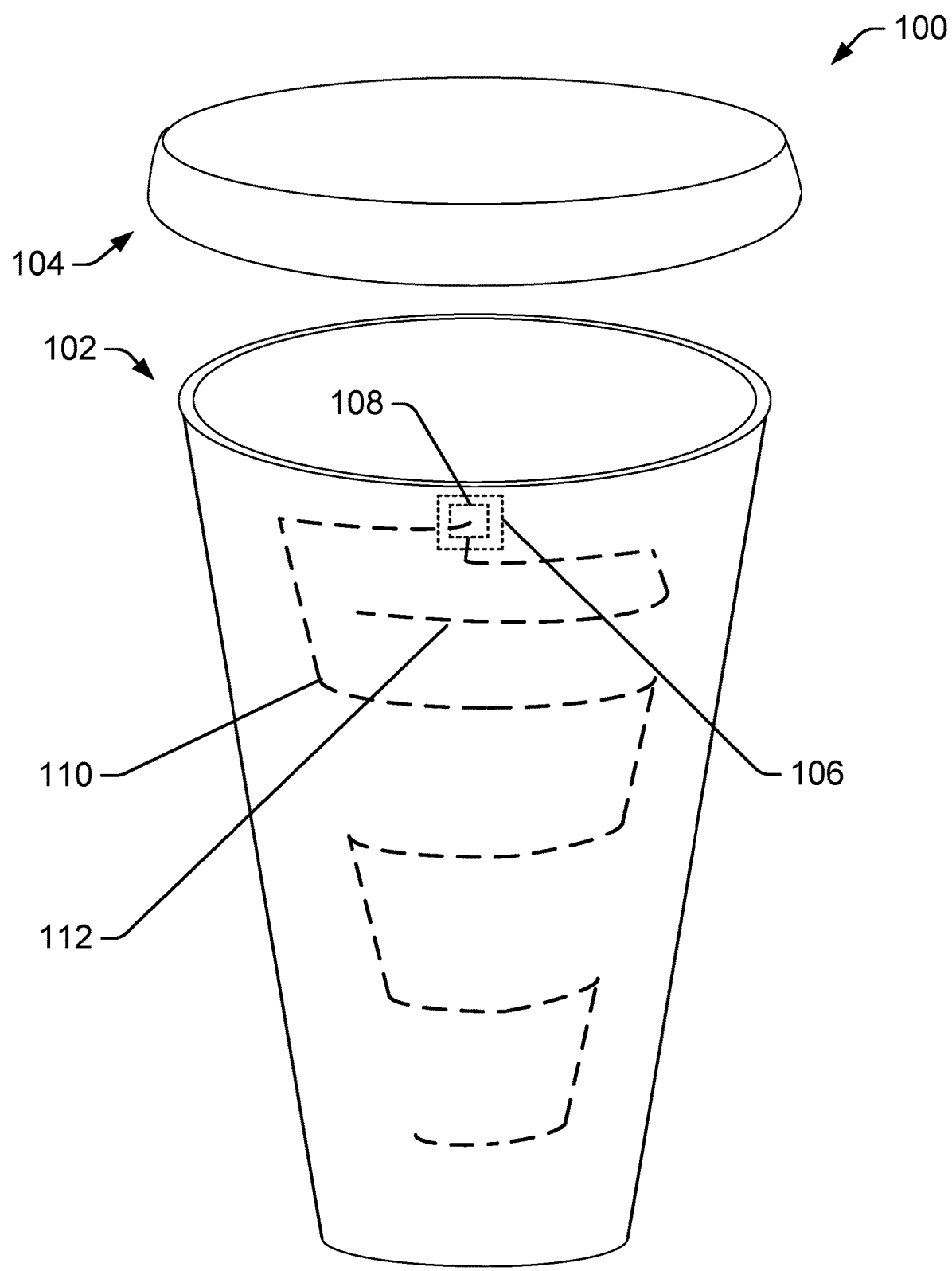
FIG. 1 is a diagram showing an example enclosure having two antennas of different lengths and showing a lid to the enclosure prior to attachment of the lid to a body of the enclosure.

FIG. 1 shows an example enclosure 100 having two antennas of different lengths and showing a lid 104 to the enclosure prior to attachment of the lid to a body 102 of the enclosure. In an example, the body 102 and the lid 104 of the enclosure 100 may be made of the same or different combination of layers and/or types of layers. In some examples, the body 102 and/or the lid 104 may include protective layer(s), substrate (e.g., strength) layer(s), foil moisture-barrier layer(s), adhesive layer(s) and/or antenna layer(s). The foil discussed herein may be made of aluminum, copper, silver, gold, or other metal, combination of metals, alloy, or other material(s).

The foil layer(s) provide excellent water resistance, but may prevent RF communications. Accordingly, in the example of FIG. 1 an opening 106 is shown in the foil layer. The opening is shown in dotted outline to indicate that in the example enclosure 100, the foil layer is not the most external of the layers. An antenna layer is external to the foil layer, but is also not the most external of the layers. Accordingly, the antennas of the example antenna layer are shown in dotted outline. The example shows two antennas that have been etched or otherwise defined on the layer. In an example of etching, the two antennas may be made of aluminum foil, which reside on a substrate. A longer antenna 110 is associated with RF transmission and/or reception at a first frequency, and a shorter antenna 112 is associated with RF transmission and/or reception at a second frequency. While two antennas are shown, a greater (e.g., three, four, five, ten, etc.) or lesser number of antennas or antenna arrays could be defined in one or more antenna layers.

Figure 2:
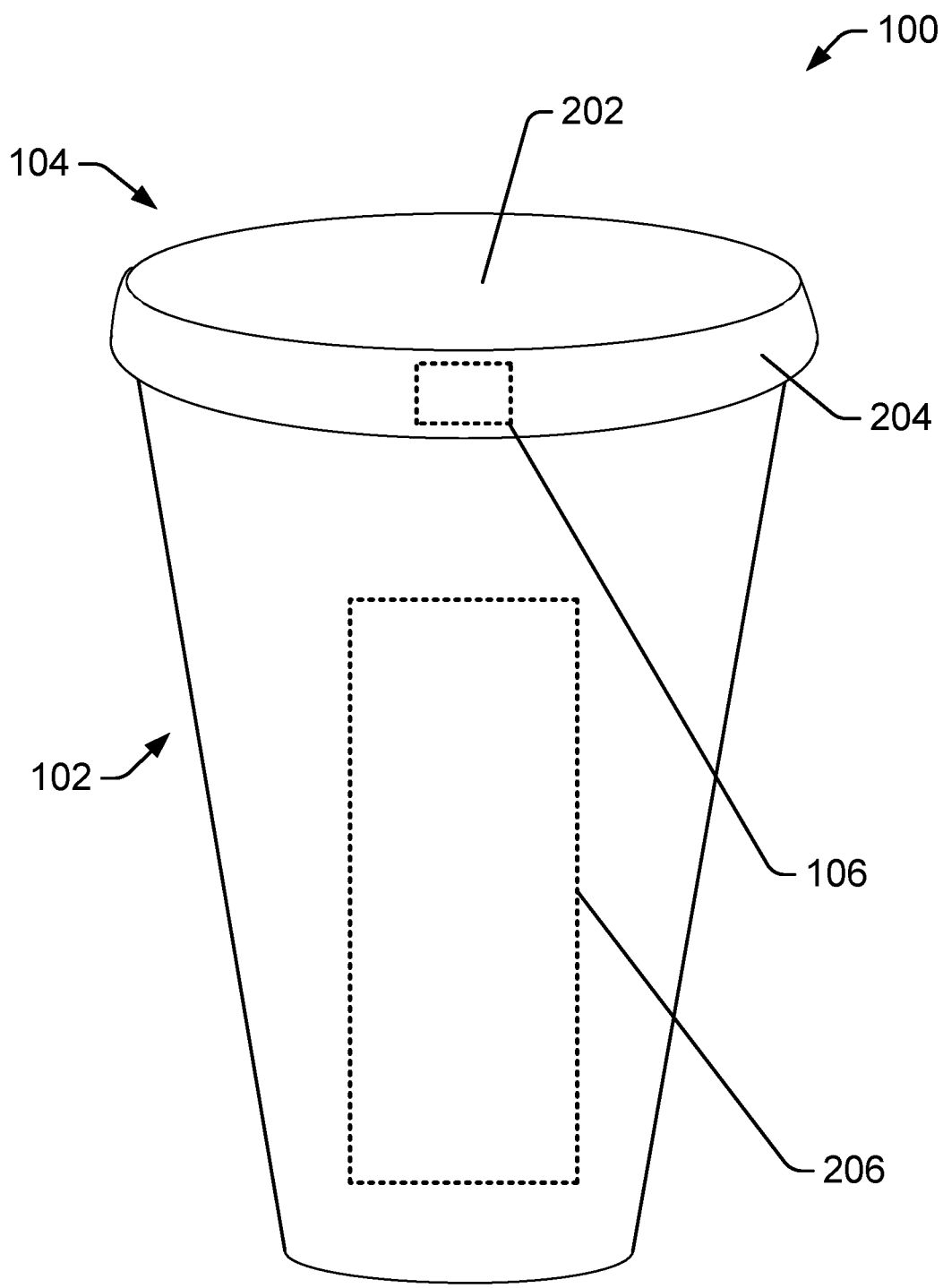
FIG. 2 is a diagram showing an example enclosure showing the lid and enclosure body in an assembled state.

FIG. 2 is a diagram showing the example enclosure 100 showing enclosure body 102 and the lid 104 in an assembled state. In the example shown, the lid 104 includes a surface 202, e.g. a top or main surface, etc. A skirt 204 may be part of the surface 202, or may be separately defined and connected to the main surface. The skirt 204 may overlap with an upper peripheral surface about the body 102. An adhesive surface on an exterior surface of the top edge of the body 102 and/or an interior surface of the skirt 204 creates a connection between the body 102 and lid 104.

The skirt 204 of the lid 104 overlaps or covers the portion of the body 102 having the opening 106 through the foil layer. The skirt 204 may in some examples cover portions of layers of the body 102 that are external to the opening 106 (i.e., may cover an area of the body encompassing and surrounding the area in which the opening 106 is defined). The opening 106 allows an electrical connection to be made between a device housed in the enclosure 100 and an antenna defined on a layer external to the foil layer. The skirt 204 may include a foil layer, which may reinforce the foil layer of the body 102 at the location of the opening 106. That is, while the foil layer of the body 102 has an opening at location 106, the opening is covered by layers of the lid 104, which may include a foil layer that does not define an opening. Accordingly, any possible decrease in protection to contents of the enclosure 100, caused by the opening 106 in the foil layer of the body 102, is compensated for by layers in the lid 104, which cover the area of the non-foiled opening 106.

A device 206 (shown in dotted outline to indicate that it is inside the enclosure 100) may be an electrically and/or mechanically operated device of any type. Examples include radios, meters, computing devices, digital devices, analog devices, valves, solenoids, batteries, antennas, application specific devices, general purposes devices, memory devices, software, etc., and combinations of these devices and/or other devices.

Figure 3:
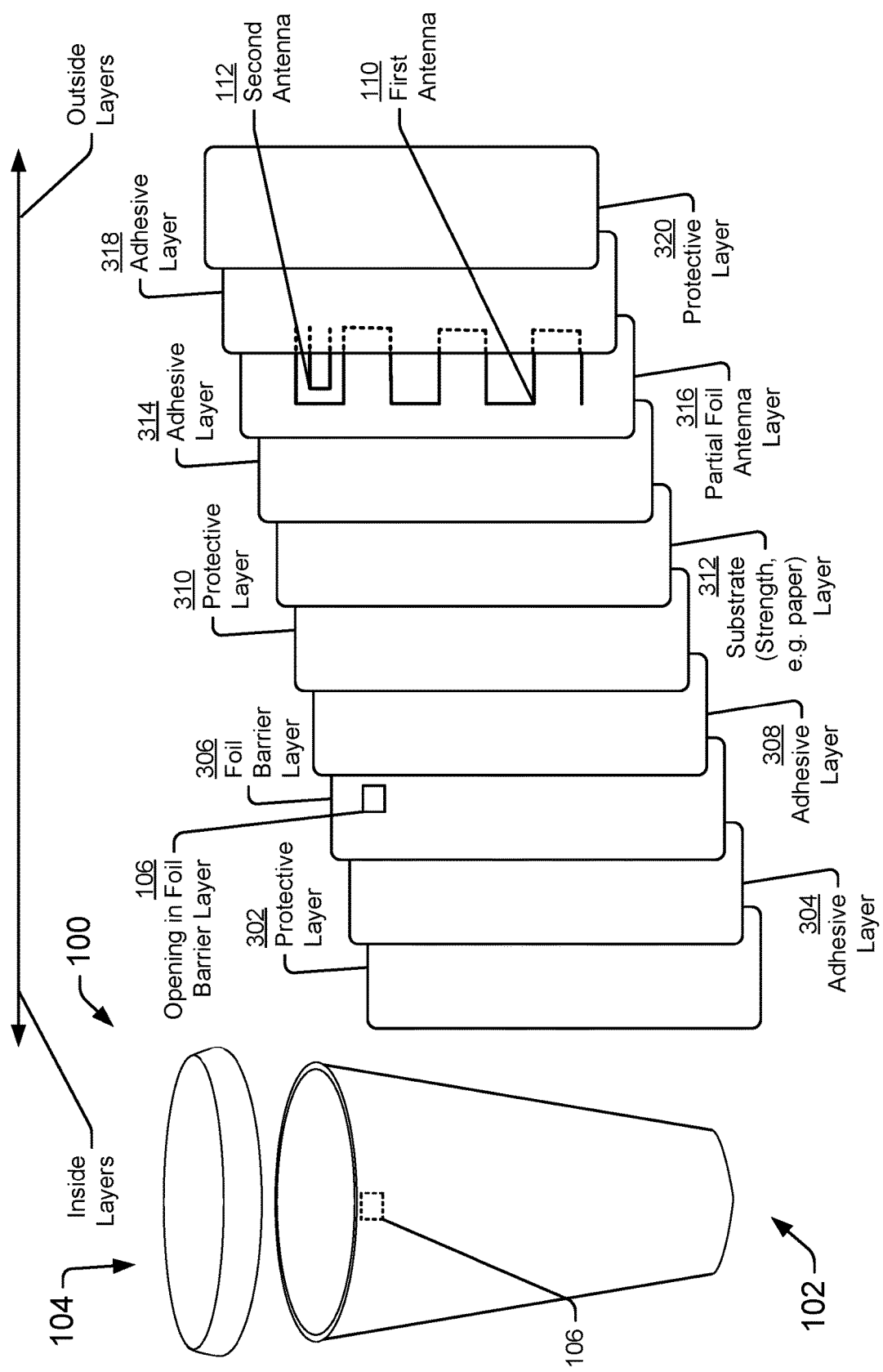
FIG. 3 is a diagram showing construction of an enclosure, showing example layers used to form the enclosure body and lid in an exploded form.

FIG. 3 shows example construction of the enclosure 100, showing the main body 102 and lid 104 in exploded (disconnected) form. The diagram also shows example layers used to form the enclosure walls in an exploded form. The layers 302 through 320 are representative of a possible construction and layer-sequencing techniques. The layers 302 through 320 are intended to represent possible construction techniques and structures adaptable to the body 102 and/or the lid 104.

A protective layer 302 may be used as an inner layer (e.g., the innermost layer) of the enclosure 100 (body 102 and/or lid 104). The protective layer 302 may be polyethylene or other material. The protective layer 302 protects the electronics carried within the enclosure 100, but also protects the inner surface of a foil layer and/or other layers that are external to the protective layer 302.

An adhesive layer 304 may be defined on the external surface of the protective layer 302, and may adhere the protective layer 302 to a foil barrier layer 306. The foil barrier layer 306 may be made of a thin film of aluminum foil that is adhered to, and protected by, the protective layer 302. In one aspect, the foil barrier layer 306 provides moisture protection to the electronics carried within the enclosure 100. The opening 106, defined in the foil barrier layer 306, allows passage of a coupling and/or connector 108 to electrically couple devices in the interior of the enclosure 100 to communicate with one or more antennas in an antenna layer. In an example, the coupling and/or connector 108 allows passage of a capacitive or inductive signal to couple the internal electronics with one or more antennas. In a second example, the coupling can be accomplished through a similar antenna structure close to the resonant antenna. In a further example, other non-galvanic means may be used to power the external antenna. Accordingly, the opening 106 allows for coupling and/or passage of electrical signals(s) between electronic devices inside the housing 100, through the foil barrier layer 306, to one or more antenna layers outside the foil barrier layer, including the antenna layer 316.

A protective layer 310 may be adhered to the outer surface of the foil barrier layer 306 by an adhesive layer 308. The protective layer 310 may be made of polyethylene, and provides electrical isolation of layer 306 from other layers, objects and/or conditions.

A substrate layer 312 may be used to provide strength to the overall laminate as well as container 100 and/or give the container 100 a desired size, shape or configuration. The substrate layer 312 may be made of paper, plastic, fiberboard, or other material, as indicated by particular design requirements. The substrate layer 312 may be adhered to adjacent layers (inside and/or outside of the substrate layer 312), such as by an adhesive layer 314 on one or both sides of the substrate layer 312. While in this example a single substrate layer 312 is shown, in other examples multiple substrate layers may be used, to give the body 102 and/or lid 104 of the enclosure 100 more strength, toughness, and/or a rigid or semi-rigid form. While the enclosure 100 is shown having a generally circular cross section resembling a cup or frustum of a cone, in other examples, the enclosure may have any number of other shapes, which may include, for example, cylinders, cubes, rectangular boxes, spheres, custom enclosure shapes that more precisely fit the electronics within the enclosure, and others.

The adhesive layers 314, 318 may adhere to the inner and outer surfaces, respectively, of the partial foil antenna layer 316. The partial foil antenna traces are deposited on a carrier material. The "partial" foil antenna has antenna artwork (made of electrically conductive material) and only traces associated with one or more antennas are defined in this foil lamination. The antenna(s) defined on the antenna layer 316 may have lengths that correspond to particular frequencies over which each antenna is to be used. The length of the antenna(s) may be based on full wave length(s), or partial wave length(s), etc. of frequencies of interest used by the final product. Each antenna may be attached to an associated coupling component or pad from electronics housed within 100, the signal passes through the opening 106 in the foil barrier layer 306, and connects to appropriate RF electronics within the enclosure 100. In the example shown, a first antenna 110 and a second antenna 112 are shown. The antennas may have a square wave or other shape, as indicated by design requirements, required antenna length, and the frequency of use.

The adhesive layer 318 may also adhere to an exterior protective layer 320, which may be formed of polyethylene or other material, as indicated by design requirements.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A water-resistant enclosure, comprising:
   a main body, comprising:
      a foil layer of the main body to provide a moisture barrier to protect an interior of the water-resistant enclosure, wherein the foil layer of the main body defines an opening to allow electrical communication through the foil layer of the main body; and
      an antenna layer, located in a position external to the foil layer of the main body, wherein the antenna layer is electrically connected to a conductor passing through the opening through the foil layer of the main body; and
   a cap, attached to the main body by adhesive, the cap comprising:
      a top surface;
      a skirt extending from a periphery of the top surface of the cap;
      a foil layer of the cap disposed within the skirt overlaying the opening in the foil layer of the main body and an upper peripheral surface of the main body; and
      a protective layer adhered to an exterior surface of the foil layer of the cap.

2. The water-resistant enclosure as recited in claim 1, wherein the antenna layer comprises:
   an etched foil layer, comprising a plurality of antennas etched in foil of the etched foil layer; and
   a substrate layer, adhered to the etched foil layer.

3. The water-resistant enclosure as recited in claim 1, wherein the cap additionally comprises a substrate, upon which the foil layer of the cap is disposed.

4. The water-resistant enclosure as recited in claim 1, additionally comprising:
   a substrate layer; and
   an adhesive layer, between the foil layer of the main body and the substrate layer.

5. The water-resistant enclosure as recited in claim 1, wherein the main body additionally comprises:
   a protective layer; and
   an adhesive layer, wherein the adhesive layer adheres the protective layer to the foil layer of the main body.

6. The water-resistant enclosure as recited in claim 1, wherein:
   the foil layer of the main body is made of aluminum; and
   the protective layer is made of polyethylene.

7. The water-resistant enclosure as recited in claim 1, additionally comprising:
   a radio device within the main body, wherein the radio device is in electrical communication, through the opening defined in the foil layer of the main body, with the antenna layer.

8. An enclosure, comprising:
   a body comprising:

a foil layer of the body defining an opening to allow passage of an electrical conductor; and an antenna layer, having an antenna defined on a substrate, the antenna layer external to the foil layer of the body;

wherein the antenna is connected to the electrical conductor passing through the opening defined in the foil layer of the body; and a cap, attached to the body of the enclosure, the cap comprising:

a top surface comprising a foil layer of the cap; and a skirt, the skirt defined about a periphery of the top surface;

wherein the skirt comprises a foil layer overlaying the opening defined in the foil layer of the body.

9. The enclosure as recited in claim 8, wherein the cap additionally comprises a substrate, upon which the foil layer of the cap is disposed.

10. The enclosure as recited in claim 8, wherein the antenna layer comprises:

a second antenna defined on the substrate and having a length that is different than a length of the antenna defined on the substrate.

11. The enclosure as recited in claim 8, additionally comprising:

a substrate layer; and an adhesive layer, between the foil layer of the body and the substrate layer.

12. The enclosure as recited in claim 8, additionally comprising:

a protective layer; and an adhesive layer, wherein the adhesive layer adheres the protective layer to the foil layer of the body.

13. The enclosure as recited in claim 12, wherein:

the foil layer of the body is made of aluminum; and the protective layer is made of polyethylene.

14. The enclosure as recited in claim 8, additionally comprising:

a radio device within the body, wherein the radio device is in electrical communication, through the opening defined in the foil layer of the body, with the antenna layer.

15. A water-resistant enclosure, comprising:

a main body, comprising:

a foil layer of the main body to provide a moisture barrier to protect an interior of the water-resistant enclosure, wherein the foil layer defines an opening to allow electrical communication through the foil layer; and an antenna layer, located in a position external to the foil layer of the main body, wherein the antenna layer is electrically connected to a conductor passing through the opening of the foil layer; and a cap, attached to the main body, and comprising a foil layer of the cap overlaying the opening defined in the foil layer of the main body of the water-resistant enclosure.

16. The water-resistant enclosure as recited in claim 15, wherein the cap additionally comprises:

a top surface; and a skirt, the skirt defined about a periphery of the top surface.

17. The water-resistant enclosure as recited in claim 15, wherein the antenna layer comprises:

a foil antenna layer, comprising a plurality of antennas in the foil antenna layer; and a substrate layer, adhered to the foil antenna layer.

18. The water-resistant enclosure as recited in claim 15, wherein the cap additionally comprises a substrate, upon which the foil layer of the cap is defined.

19. The water-resistant enclosure as recited in claim 15, additionally comprising:

a substrate layer; and an adhesive layer, between the foil layer of the main body and the substrate layer.

20. The water-resistant enclosure as recited in claim 15, additionally comprising:

a protective layer; and an adhesive layer, wherein the adhesive layer adheres the protective layer to the foil layer of the main body.

* * * * *